(12) United States Patent
Bettin et al.

(10) Patent No.: US 7,237,496 B2
(45) Date of Patent: Jul. 3, 2007

(54) MODULAR PLANTER HYDRAULIC SYSTEM AND METHOD

(75) Inventors: Leonard A. Bettin, La Grange Park, IL (US); Travis Lester Harnetiaux, Woodridge, IL (US)

(73) Assignee: CNH America LLC, Racine, WI (US)

( * ) Notice: Subject to any disclaimer, the term of this patent is extended or adjusted under 35 U.S.C. 154(b) by 74 days.

(21) Appl. No.: 11/179,168

(22) Filed: Jul. 12, 2005

(65) Prior Publication Data

US 2007/0022925 A1 Feb. 1, 2007

(51) Int. Cl.
*A01C 5/00* (2006.01)

(52) U.S. Cl. ............... 111/200; 111/900; 111/921; 111/922

(58) Field of Classification Search ......... 111/200, 111/900, 921, 922
See application file for complete search history.

(56) References Cited

U.S. PATENT DOCUMENTS

| 4,009,556 A | 3/1977 | Molzahn |
| 4,619,592 A | 10/1986 | Bender |
| 4,715,459 A | 12/1987 | Stahl |
| 4,778,349 A | 10/1988 | Browning |
| 5,158,438 A | 10/1992 | Olson et al. |
| 5,600,952 A | 2/1997 | Aquino et al. |
| 5,918,558 A | 7/1999 | Susag |
| 6,116,006 A | 9/2000 | Killen et al. |
| 6,182,588 B1 | 2/2001 | Bodie et al. |
| 6,409,273 B1 | 6/2002 | Campbell |
| 6,811,382 B2 | 11/2004 | Buchanan et al. |

FOREIGN PATENT DOCUMENTS

DE  100 16 782 A1  11/2001

*Primary Examiner*—Christopher J. Novosad
(74) *Attorney, Agent, or Firm*—Rebecca Henkel

(57) ABSTRACT

An apparatus and manufacturing method in which from one to three hydraulic pumps are provided and installed near a front end of the implement, so that a first pump can be easily coupled to the power take-off shaft of the tractor by an operator. In an exemplary embodiment of a system for a planter apparatus, one pump supplies pressure and flow to a hydraulic circuit for operating the vacuum fan subsystem, and optionally a fertilizing subsystem. A second pump supplies pressure and flow to a hydraulic circuit for operating the seed drive subsystem. A third pump supplies pressure and flow to a hydraulic circuit for operating a bulk fill subsystem. A manufacturing method that provides multiple configurations is also disclosed.

21 Claims, 8 Drawing Sheets

MODULAR PLANTER HYDRAULIC SYSTEM AND METHOD

CROSS-REFERENCE TO RELATED APPLICATIONS

Not applicable

STATEMENT REGARDING FEDERALLY SPONSORED RESEARCH OR DEVELOPMENT

Not applicable

TECHNICAL FIELD

This invention relates to agricultural equipment in the form of a farm implement that is pulled behind a tractor and has hydraulic systems for operating various subsystems on the farm implement.

DESCRIPTION OF THE BACKGROUND ART

Farm implements include harvesters, seed planters and other implements. Seed planters can be rather sophisticated pieces of equipment with subsystems for bulk filling of the planter, for metering the dispensing of seeds and for dispensing fertilizer.

Features in agricultural implements requiring mechanical power are often driven by hydraulic subsystems as disclosed in Killeen, U.S. Pat. No. 6,116,006, where a hydraulic system is disclosed for a harvester.

In Molzahn, U.S. Pat. No. 4,009,556, a third pump for supplying fluid to a crop harvester is located on the tractor and coupled to two other pumps for driving motors coupled to the wheels of the tractor. This system requires that hydraulic lines run from the third pump across a hitching gap to the farm implement. In a construction tractor disclosed in Stahl, U.S. Pat. No. 4,715,459, it has been known to connect three pumps together with one pump dedicated to auxiliary equipment being detachable from the other two. All three pumps are carried by the tractor.

Other agricultural systems providing hydraulic systems in whole or in part on the tractor are seen Bodie et al., U.S. Pat. No. 6,182,588 and Susag, U.S. Pat. No. 5,918,558.

Although it is convenient to locate hydraulic pumps on the tractor, it then becomes necessary to connect hydraulic lines to hydraulic devices on any trailing farm implement.

It is also desirable that farm implements be sold in multiple configurations ranging from lower cost, basic function equipment to higher cost, multi-featured equipment.

A technical problem remains in how to arrive at a multi-featured farm implement that is relatively easy to configure for different levels of hydraulically driven functions.

Another technical problem is providing equipment that is easy to hitch up to a tractor, by a single operator.

SUMMARY OF THE INVENTION

At least some inventive embodiments include a modular pump assembly for incorporation in an agricultural implement to be pulled by a tractor, the pump assembly comprising a plurality of hydraulic pumps which can be supported on the agricultural implement proximate a tow bar and coupled one pump to another, the hydraulic pumps being coupled through one of the hydraulic pumps to a power take-off on the tractor, and the hydraulic pumps being connectable to respective hydraulic circuits on the agricultural implement to provide at least two optional configurations for selection by a customer, one with first and second hydraulic pumps and one with only the first hydraulic pump.

In some cases a first one of the plurality of hydraulic pumps can be connected to hydraulic subcircuits for operation of two respective subsystems on the agricultural implement. In some embodiments the two respective subsystems are a vacuum fan subsystem and a fertilizer subsystem. In some embodiments the plurality of hydraulic pumps comprises at least three hydraulic pumps for connection to three respective hydraulic circuits on the agricultural implement.

In some cases the three respective hydraulic circuits include a first hydraulic circuit for operating a vacuum fan subsystem and a fertilizer subsystem, a second hydraulic circuit for operating at least one seed drive subsystem and a third hydraulic circuit for operating a bulk fill subsystem. In some embodiments the pumps are nested together on the tow bar for close coupling to each other and to the tractor power take-off.

In some embodiments the pumps have a similar shape but varying capacities. In some cases a cover is disposed over an nestable portion of the pump furthest from the tractor power take-off. In some cases a first one of the plurality of pumps has a pump drive shaft extending toward the tractor, and further comprising a support on the tow bar for supporting the plurality of pumps in position for coupling to the power take-off on the tractor. In some cases the agricultural implement is a seed planter.

Other embodiments include a method of manufacturing an agricultural implement to be pulled by a tractor, the method comprising mounting first and second hydraulic pumps proximate a front end of the agricultural implement, coupling a shaft on the second hydraulic pump to a first hydraulic pump for being driven together from a power take-off on the tractor and connecting the first and second hydraulic pumps to two respective hydraulic circuits for two subsystems on the agricultural implement to provide at least two configurations for selection by a customer, one with the first and second hydraulic pumps and one with only the first hydraulic pump.

In some cases the first hydraulic pump can be connected to hydraulic subcircuits for operation of two respective subsystems on the agricultural implement. In some cases the two respective subsystems are a vacuum fan subsystem and a fertilizer subsystem. Some embodiments further include the steps of connecting a third hydraulic pump to the second hydraulic pump and connecting the third hydraulic pump to a third respective hydraulic circuit for operating a third subsystem on the agricultural implement.

In some cases the two respective hydraulic circuits include a first hydraulic circuit for operating a vacuum fan subsystem and a fertilizer subsystem, and a second hydraulic circuit for operating at least one seed drive subsystem and wherein the third respective hydraulic circuit for operating a bulk fill subsystem. In some cases the step of mounting the pumps further comprises nesting the pumps together on a tow bar of the agricultural implement for close coupling to each other and to the tractor power take-off. In some cases the method further comprising providing the pumps with a similar shape but varying capacities. In some cases the method further comprising mounting a cover over a nestable portion of the pump furthest from the power take-off shaft.

In some embodiments the first hydraulic pump has a pump drive shaft extending toward the tractor, and further comprising supporting the first and second hydraulic pumps in position for coupling to the power take-off shaft on the tractor. In some cases the agricultural implement is a seed planter.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
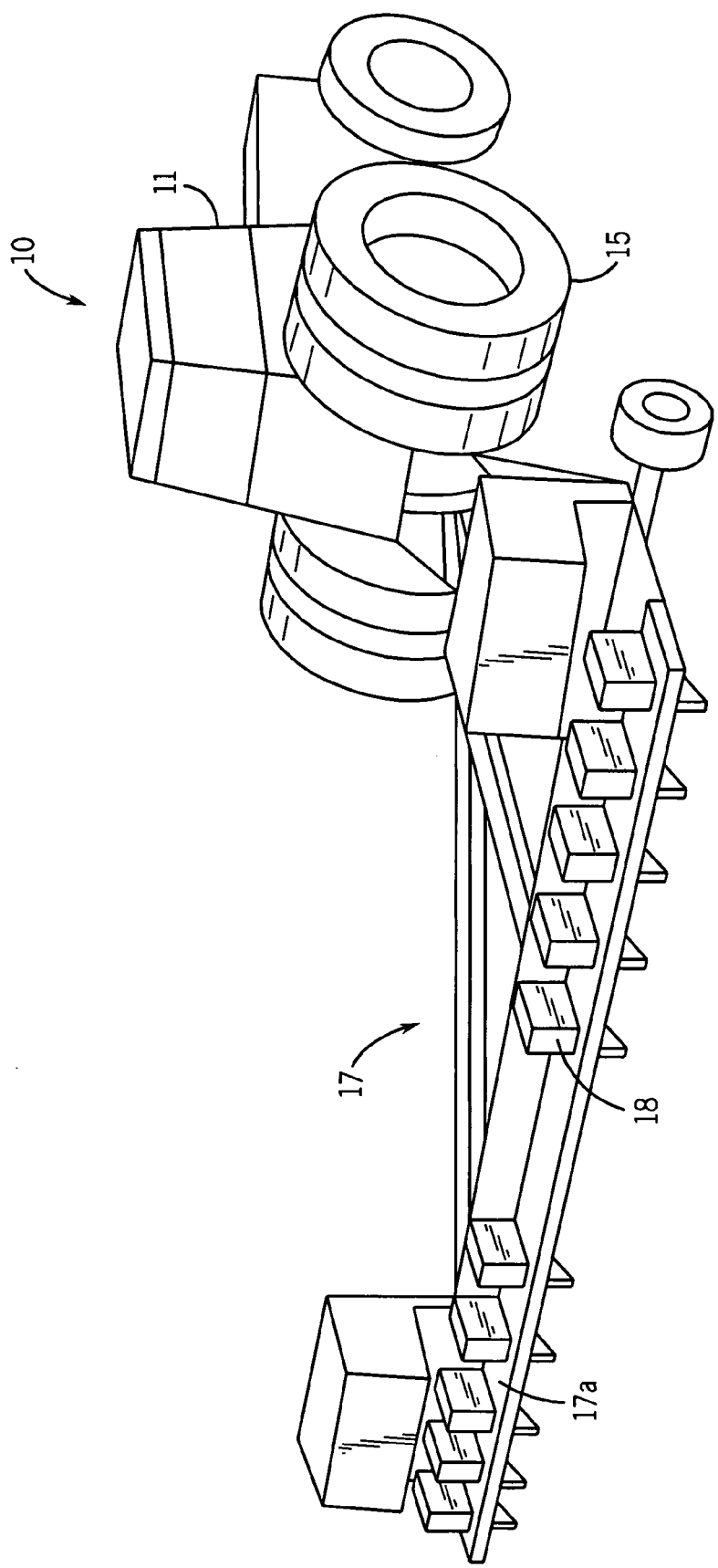
FIG. 1 is a simplified view of an agricultural tractor pulling a seed planter agricultural implement.

Referring to FIG. 1, a tractor 10 is seen pulling an agricultural implement 17, which in this case, is a seed planter. The present invention is also be applicable to harvesters and other types of agricultural implements. The tractor 10 has a cab 11 and large rear drive wheels 15. The agricultural implement 17 has a transverse bar 17a across which individual seed hoppers or row units 18 are disposed to dispense seeds along rows made in the ground by other parts of the planter.

Figure 2:
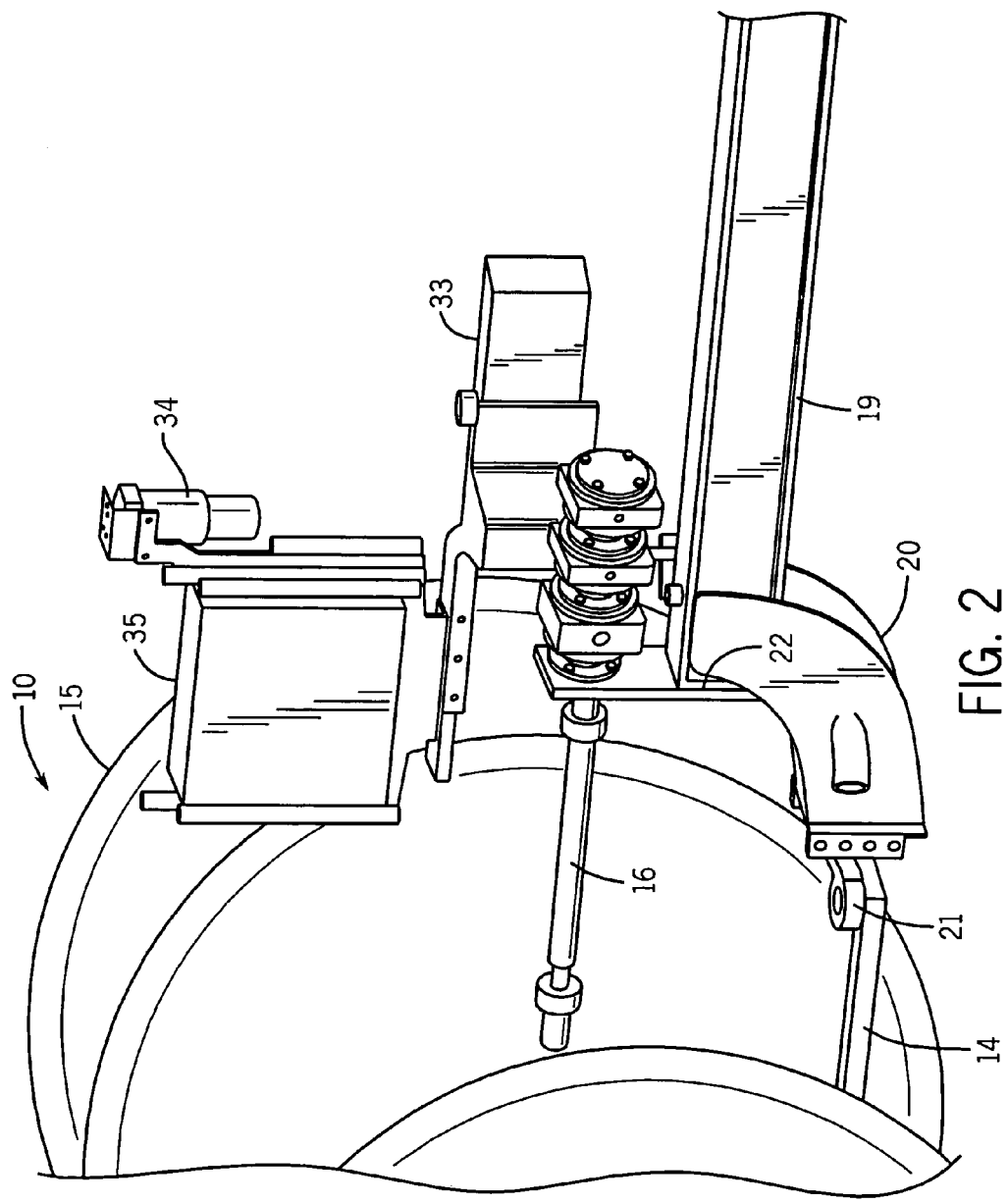
FIGS. 2 and 3 are detailed perspective views of a rear end of the tractor and a front end of the seed planter.

FIG. 2 shows a perspective schematic view of the rear end of the tractor 10 and the wheels 15, where a tow bar 19 on the agricultural implement 17 extends to a height adjustment bar 20 and then to a hitch coupling 21 for coupling to a hitching support 14 on the tractor 10 with a coupling pin (not shown) of a type known in the art.

Figure 3:
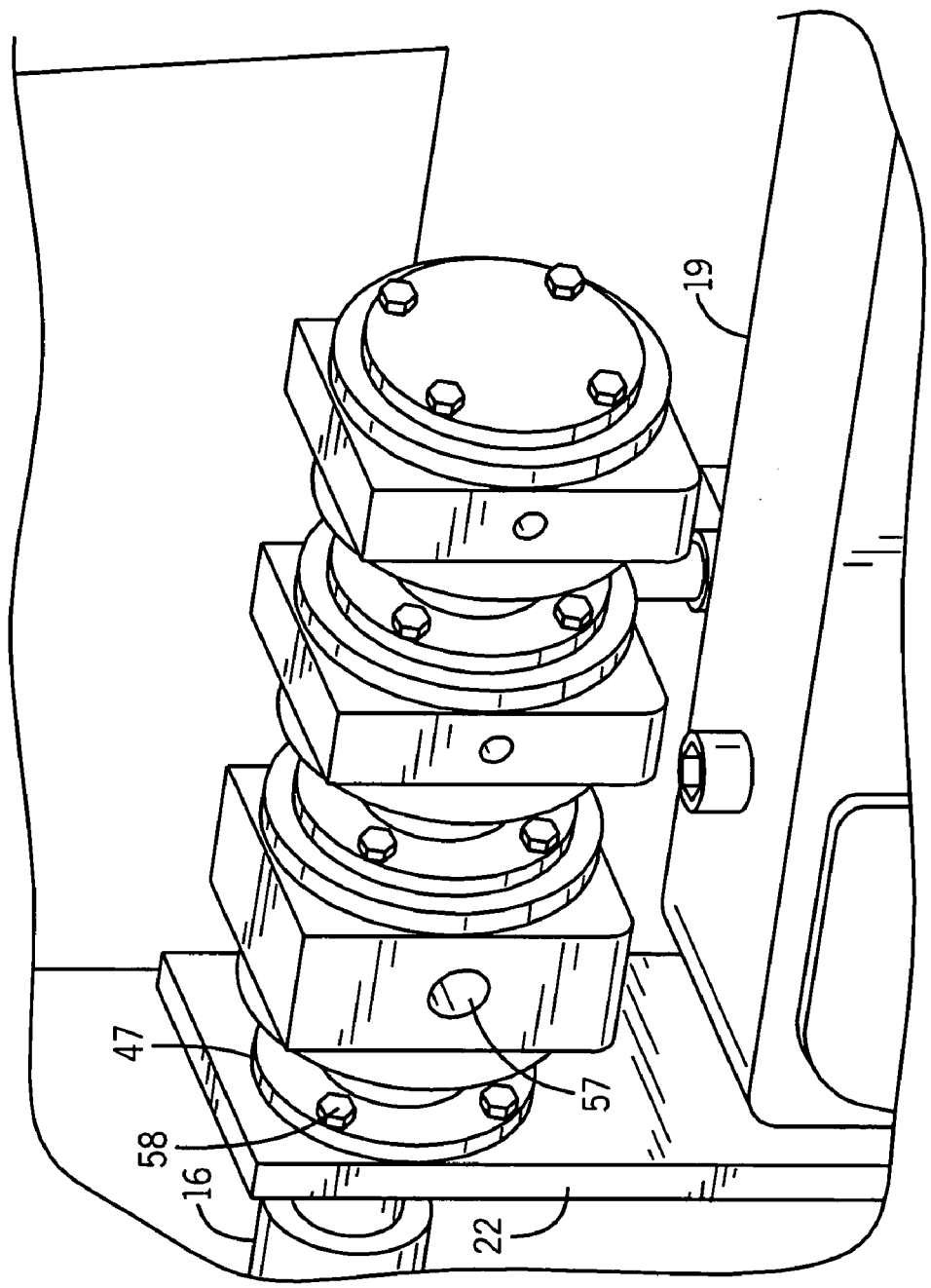

As in FIGS. 2 and 3, a plurality of modular hydraulic pumps PUMP 1, PUMP 2 and PUMP 3 are disposed near a front end of the implement facing toward the tractor 10, so as to be connected to a power take-off (PTO) shaft 16 from the tractor 10. Preferably, an upstanding support 22 is provided at the front end of tow bar 19 to support the coupled pumps, PUMP 1, PUMP 2 and PUMP 3, for easy connection to the PTO shaft 16. A flange 47 on the first pump, PUMP 1, is fastened to the support with fasteners 58. Also seen in FIG. 2 is a hydraulic reservoir 33, a filter 34 and a cooling unit 35.

Figure 4:
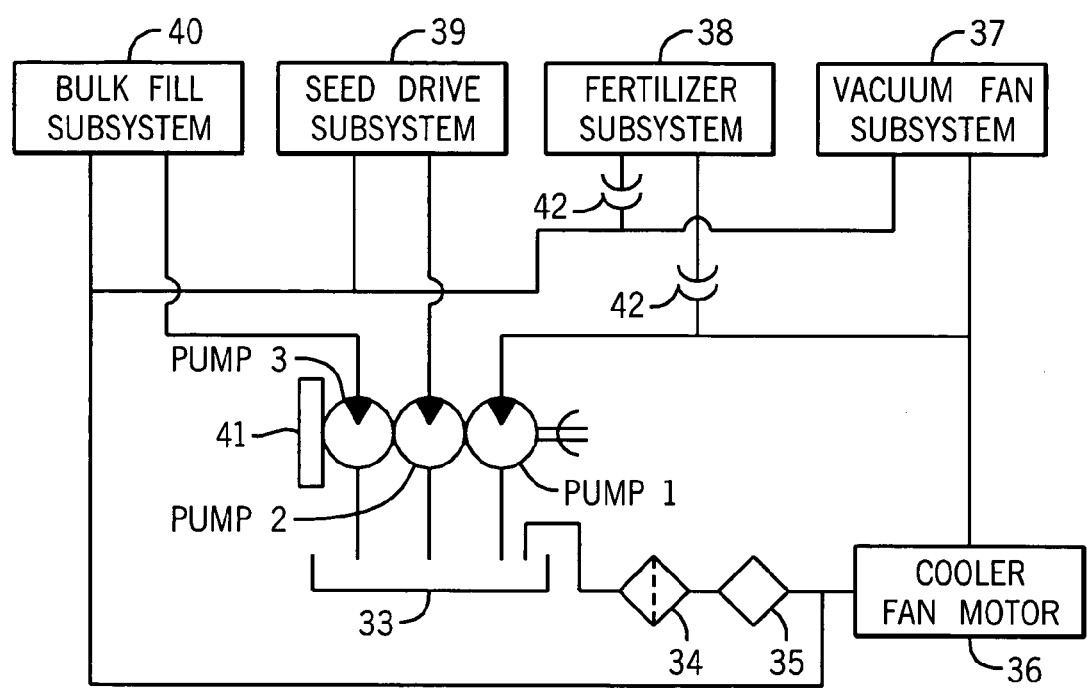
FIG. 4 is a block diagram of the power system of the tractor and the modular hydraulic system of the present invention.
Figure 5:
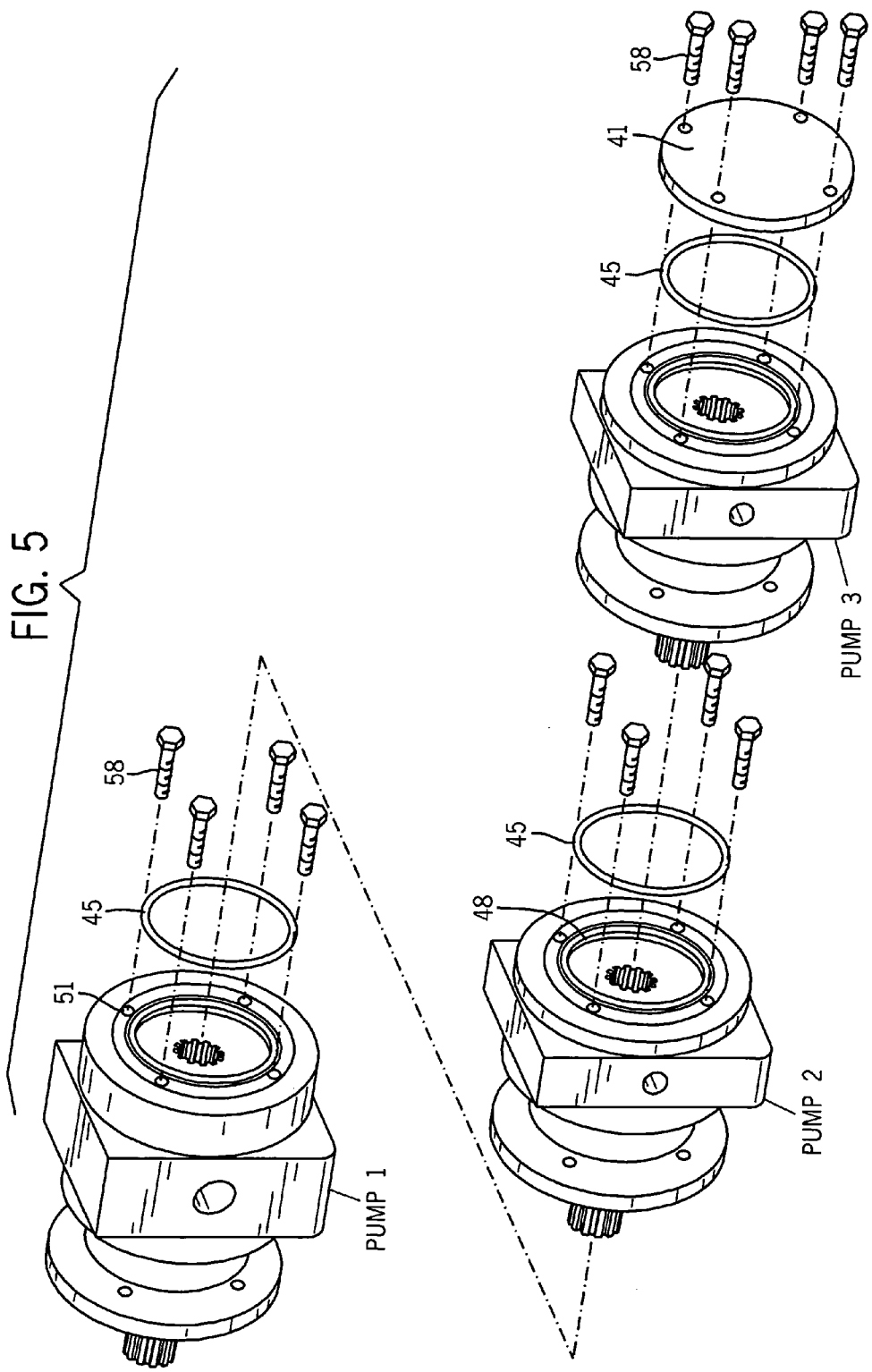
FIGS. 5 and 6 are exploded perspective views of the modular pumps of the present invention seen in FIGS. 2-4.

Referring next to FIG. 4, fixed displacement hydraulic pumps, PUMP 1, PUMP 2 and PUMP 3 are provided to impart pressure to the flow for different hydraulic circuits to power various functions on the seed planter 17. Each of the pumps, PUMP 1, PUMP 2 and PUMP 3, receives fluid from the reservoir 33 and imparts pressure that causes fluid to flow to and drive various hydraulic motors in hydraulic subsystems, 37, 38, 39 and 40. A cooler fan motor 36 powers a fan (not shown) to help provide cooling of the fluid in cooling unit 35. Fluid flows through the cooling unit 35 and the filter 34 to the reservoir 33.

The configuration of the hydraulic pumps during manufacture and assembly is variable, depending on the number of hydraulic systems in the planter 17 that have been ordered by the customer. Only one pump, PUMP 1, is required for the basic configuration of the implement. This pump, PUMP 1, supplies flow to the vacuum fan flow control valve and then to a vacuum fan hydraulic motor in a vacuum fan subsystem 37. A fertilizer subsystem 38 is an option and this pump, PUMP 1, could power just the vacuum fan subsystem 37 or both the vacuum fan subsystem 37 and the fertilizer subsystem 38. The connections that look like two C's indicate that the fertilizer subsystem 38 is an option that can be added. When a hydraulic seed subsystem 39 is added, an additional pump, PUMP 2, is added to supply flow to the seed drive flow control valves (not shown) and to drive the seed drive motor(s) in the subsystem 39. When the addition of a bulk seed fill subsystem 40 has been ordered, an additional pump, PUMP 3, is added to supply flow to the bulk fill flow control valve and to drive the bulk fill fan motor in the subsystem 40 which moves seed from the bulk fill hopper to the seed meters for distribution to the ground rows. The second and third pumps, PUMP 2 and PUMP 3, and their subsystems, can be reversed in position relative to the first pump, PUMP 1, and its subsystems.

As seen in FIGS. 5-8, the individual pumps, PUMP 1, PUMP 2 and PUMP 3, are coupled through their drive shafts and nested together and sealed by an O-ring 45 disposed between a disc-stepped portion 46 of a disc plate 47 (FIG. 7) on a front face of each pump and a groove 59 in a disc plate 49 (FIG. 8) on each rear face of each pump. The disc-stepped portion 46 is received in a depression 48 that has a slightly larger diameter, so that the disc plates 47, 49 are pressed against each other. The disc plates 47, 49 are fastened together by inserting fasteners 58 through holes 50, 51 shown in FIGS. 5-8. The pumps each have a shaft 52 (FIG. 7) extending from the front face with an external spline 53 to fit within an internal spline 54 in an opening 55 (FIG. 8) in a rear face of the next pump. The drive shaft 52 of the first pump extends through the support 22 for coupling to the PTO take-off shaft 16 (FIG. 2). The rear face of the last pump, including the depression 48 and the opening 55 will be covered with a disc-shaped cover 41.

The result of this pump configuration and assembly is that a forward face of each successive pump will be nested in a rear face of a preceding pump, except for the last pump, which is closed by the cover 41 which is fastened to the disc plate 49 on the rear face of the last pump, PUMP 3.

Figure 6:
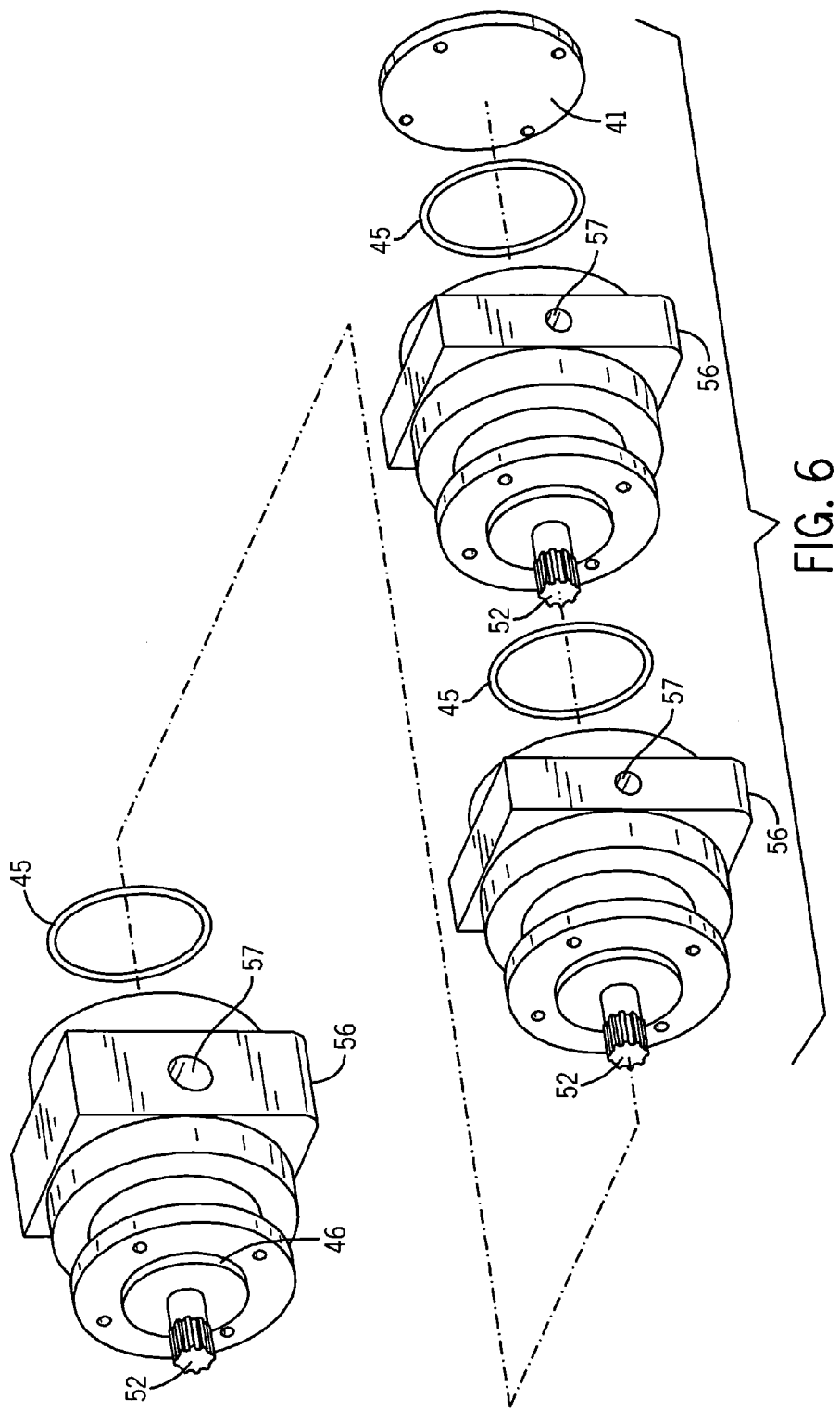
Figure 7:
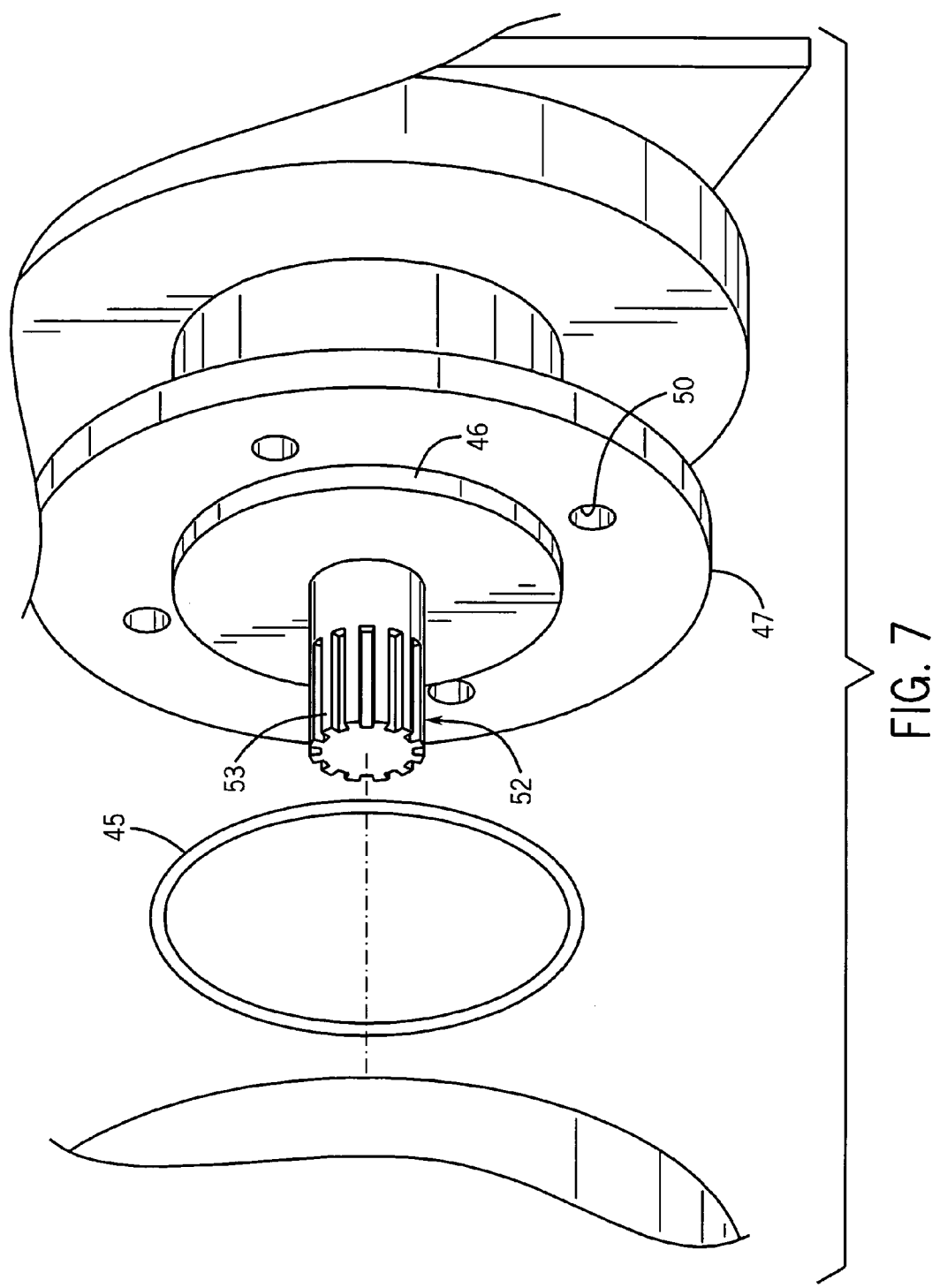
FIGS. 7 and 8 are enlarged detail views of a single pump seen in FIGS. 5 and 6.
Figure 8:
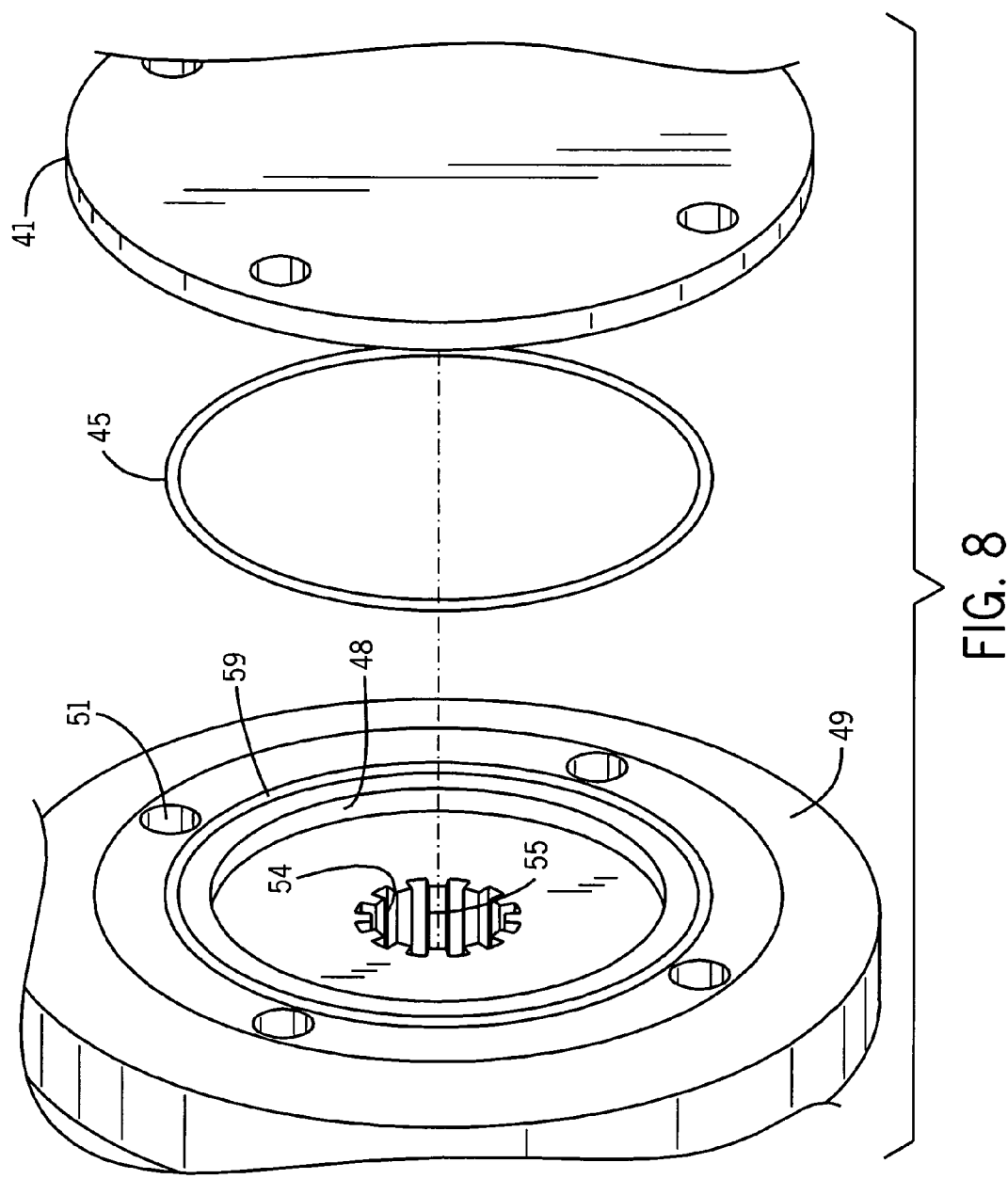

The pumps also have a rectangular casing 56. The pumps have a similar shape but may vary in length, for example, to provide pumps of varying capacity to handle the respective subsystems. As seen in FIG. 6, ports 57 are provided on the sides of this casing 56 attachment of hydraulic lines which are connected to the subsystems 37-40 in FIG. 4.

This has been a description of the preferred embodiments, but it will be apparent to those with skill in the art to which the invention pertains that various modifications may be made to these specific embodiments without departing from the spirit of the present invention, and that such modifications are intended to be encompassed by the following claims.

We claim:

1. A modular pump assembly for incorporation in an agricultural implement to be pulled by a tractor, the pump assembly comprising:

a plurality of hydraulic pumps which can be supported on the agricultural implement proximate a tow bar and coupled one pump to another, the hydraulic pumps being coupled through one of the hydraulic pumps to a power take-off on the tractor, and the hydraulic pumps being connectable to respective hydraulic circuits on the agricultural implement to provide at least two optional configurations for selection by a customer, one with first and second hydraulic pumps and one with only the first hydraulic pump, each of the plurality of hydraulic pumps includes a front face having a shaft with an external spline, and an internal spline in an opening on a rear portion, each of a preceding one of the plurality of hydraulic pumps being coupled with a succeeding one of the plurality of hydraulic pumps by mating the opening and the internal spline of the preceding hydraulic pump with the shaft and the external spline of the succeeding hydraulic pump.

2. The pump assembly of claim 1, wherein a first one of the plurality of hydraulic pumps can be connected to hydraulic subcircuits for operation of two respective subsystems on the agricultural implement.

3. The pump assembly of claim 2, wherein the two respective subsystems are a vacuum fan subsystem and a fertilizer subsystem.

4. The pump assembly of claim 1, wherein the plurality of hydraulic pumps comprises at least three hydraulic pumps for connection to three respective hydraulic circuits on the agricultural implement.

5. The pump assembly of claim 4, wherein the three respective hydraulic circuits include a first hydraulic circuit for operating a vacuum fan subsystem and a fertilizer subsystem, a second hydraulic circuit for operating at least one seed drive subsystem and a third hydraulic circuit for operating a bulk fill subsystem.

6. The pump assembly of claim 1, wherein the pumps are nested together on the tow bar for close coupling to each other and to the tractor power take-off.

7. The pump assembly of claim 6, wherein the pumps have an approximately same shape but varying capacities.

8. The pump assembly of claim 7, wherein a cover is disposed over an nestable portion of the pump furthest from the tractor power take-off.

9. The pump assembly of claim 1, wherein a first one of the plurality of pumps has a pump drive shaft extending toward the tractor, and further comprising a support on the tow bar for supporting the plurality of pumps in position for coupling to the power take-off on the tractor.

10. The pump assembly of claim 1, wherein the agricultural implement is a seed planter.

11. A method of manufacturing an agricultural implement to be pulled by a tractor, the method comprising:
mounting first and second hydraulic pumps proximate a front end of the agricultural implement;
coupling a shaft on the second hydraulic pump to a first hydraulic pump for being driven together from a power take-off on the tractor, each of the first hydraulic pump and the second hydraulic pump includes a front face having a shaft with an external spline, and an internal spline in an opening on a rear portion, the first hydraulic pump being coupled with the second hydraulic pump by mating the opening and the internal spline of the first hydraulic pump with the shaft and the external spline of the second hydraulic pump; and
connecting the first and second hydraulic pumps to two respective hydraulic circuits for two subsystems on the agricultural implement to provide at least two configurations for selection by a customer, one with the first and second hydraulic pumps and one with only the first hydraulic pump.

12. The method of claim 11, wherein the first hydraulic pump can be connected to hydraulic subcircuits for operation of two respective subsystems on the agricultural implement.

13. The method of claim 12, wherein the two respective subsystems are a vacuum fan subsystem and a fertilizer subsystem.

14. The method of claim 11, further comprising connecting a third hydraulic pump to the second hydraulic pump, and connecting the third hydraulic pump to a third respective hydraulic circuit for operating a third subsystem on the agricultural implement.

15. The method of claim 14, wherein the two respective hydraulic circuits include a first hydraulic circuit for operating a vacuum fan subsystem and a fertilizer subsystem, and a second hydraulic circuit for operating at least one seed drive subsystem and wherein the third respective hydraulic circuit for operating a bulk fill subsystem.

16. The method of claim 11, wherein mounting the pumps further comprises nesting the pumps together on a tow bar of the agricultural implement for close coupling to each other and to the tractor power take-off.

17. The method of claim 16, further comprising providing the pumps with an approximately same shape but varying capacities.

18. The method of claim 17, further comprising mounting a cover over a nestable portion of the pump furthest from the power take-off shaft.

19. The method of claim 11, wherein the first hydraulic pump has a pump drive shaft extending toward the tractor, and further comprising supporting the first and second hydraulic pumps in position for coupling to the power take-off shaft on the tractor.

20. The method of claim 11, wherein the agricultural implement is a seed planter.

21. A modular pump assembly for incorporation in an agricultural implement to be pulled by a tractor, the pump assembly comprising:
a plurality of hydraulic pumps which can be supported on the agricultural implement proximate a tow bar and coupled one pump to another, the hydraulic pumps being coupled through one of the hydraulic pumps to a power take-off on the tractor, and the hydraulic pumps being connectable to respective hydraulic circuits on the agricultural implement to provide at least two optional configurations for selection by a customer, one with first and second hydraulic pumps and one with only the first hydraulic pump, each of the plurality of hydraulic pumps includes a first disc plate on a front face with a disc-stepped portion and a shaft with an external spline, and a second disc plate having an internal spline in an opening on a rear portion, each of a preceding one of the plurality of hydraulic pumps being coupled with a succeeding one of the plurality of hydraulic pumps by mating the second disc plate and corresponding opening and internal spline of the preceding hydraulic pump with the first disc plate and corresponding shaft and external spline of the succeeding hydraulic pump, each of the first disc plate and the second disc plate which are so mated being fastened together with a plurality of fasteners.

* * * * *